United States Patent
Herth

(10) Patent No.: US 6,956,168 B2
(45) Date of Patent: Oct. 18, 2005

(54) HORIZONTAL ELECTRICAL BOX

(76) Inventor: Greg Herth, 10 Tower Mews, Oakdale, NY (US) 11769

( * ) Notice: Subject to any disclaimer, the term of this patent is extended or adjusted under 35 U.S.C. 154(b) by 0 days.

(21) Appl. No.: 10/891,666

(22) Filed: Jul. 15, 2004

(65) Prior Publication Data

US 2005/0011661 A1    Jan. 20, 2005

Related U.S. Application Data

(60) Provisional application No. 60/488,522, filed on Jul. 19, 2003.

(51) Int. Cl.[7] .............................................. H02G 3/08
(52) U.S. Cl. ........................... 174/53; 174/50; 174/58; 220/3.3; 220/3.9; 248/906
(58) Field of Search .............................. 174/50, 53, 48, 174/57, 58, 17 R, 54, 61, 62, 49; 220/3.2, 220/3.3, 3.4, 3.5, 3.6, 3.7, 3.8, 3.9, 4.02; 248/906, 343, 318; 439/535; D13/152

(56) References Cited

U.S. PATENT DOCUMENTS

| | | | | |
|---|---|---|---|---|
| 2,730,261 A | * | 1/1956 | Tutt ............................ | 220/3.7 |
| 2,757,817 A | * | 8/1956 | Egan ........................... | 220/3.5 |
| 4,788,383 A | * | 11/1988 | Caison ......................... | 174/48 |
| 5,448,012 A | * | 9/1995 | Jacob .......................... | 174/48 |
| 5,600,093 A | * | 2/1997 | Herth et al. .................. | 174/53 |
| 6,100,469 A | * | 8/2000 | Jorgensen et al. ........... | 248/906 |
| 6,278,058 B1 | * | 8/2001 | Anderson ..................... | 174/50 |
| D461,455 S | * | 8/2002 | Forbes ....................... | D13/152 |
| 6,632,998 B1 | * | 10/2003 | Gretz .......................... | 174/58 |
| 6,756,541 B1 | * | 6/2004 | Mollick et al. ............... | 174/58 |
| 6,800,806 B1 | * | 10/2004 | Grday ......................... | 174/50 |

* cited by examiner

Primary Examiner—Dean A. Reichard
Assistant Examiner—Angel R. Estrada
(74) Attorney, Agent, or Firm—Alfred M. Walker

(57) ABSTRACT

A modular interchangeable baseboard mounted electrical work box having a housing for mounting one or a plurality of electrical devices, such as switches or outlets. Each support module is adapted for supporting a specific electrical component and the support modules have fastener insert sheaths for fasteners, such as screws or nails, for attaching the work box to a vertical wall stud or to a horizontal baseboard stud so as to permit interchangeable positioning of the box upon the baseboard. The box is interchangeable in that it can be used for either a new work box in new construction or for an old work box for replacement of existing work boxes or upgrading electrical service.

8 Claims, 3 Drawing Sheets

HORIZONTAL ELECTRICAL BOX

RELATED APPLICATIONS

This application is based upon provisional patent application No. 60/488,522 filed Jul. 19, 2003 and claims benefit under 35 USC § 119(e) thereof.

FIELD OF THE INVENTION

This invention relates to residential and commercial electrical wiring and more particularly to modular baseboard or cabinet mounted electrical boxes for use either as a "new work box" or an "old work box".

BACKGROUND OF THE INVENTION

Electrical work boxes are utilized in buildings to distribute electrical power from the power supply to electrical devices such as outlets or switches. An electrical work box includes a metal or plastic housing containing a recess for electrical components such as wire outlets or switches. In addition, low voltage boxes are used for low voltage wiring for computer, telephone, and other low voltage electrical applications.

Presently, conventional electrical boxes are referred to colloquially either new work boxes, for new building construction, or old work boxes, for retrofitting into existing buildings. New work boxes have protruding accessory exterior sheaths for nailing the new work boxes to exposed wood or metal studs within a building. However, because the screw or nail mounting brackets protrude up from the external silhouette shape of the work box, the brackets interfere with the flush mounting of the work box within a hole within a building wall. Moreover, old work boxes are frequently held in place by bent tabs which engage sheetrock boards thus minimizing stability, as the sheetrock is prone to gradually falling apart.

Existing electrical work boxes are described in U.S. Pat. No. 4,424,406 of Slater and U.S. Pat. No. 4,436,952 of Lockwood.

Lockwood '952 describes a work box with a conventional accessory screw holding bracket protruding up from the surface of one of the walls of the work box. The protruding bracket interferes with the flush placement of the work box within a hole within a wall corresponding in shape to the exterior of the work box.

Slater '406 describes a work box in general but is silent about a mounting means for the work box.

An improvement in electrical work boxes is shown in Applicant's U.S. Pat. No. 5,600,093 of Herth and Davis, which describes an electrical work box for new work and old work, wherein a novel attachment is described for vertically attaching the electrical work box to a building stud via an angled screw mount within the electrical work box.

However, Herth and Davis '093 does not describe a horizontally oriented electrical work box which can be mounted horizontally to a vertical wall stud.

OBJECTS OF THE INVENTION

It is therefore an object of the present invention to provide a dual purpose baseboard mounted electrical work box which can be adapted for multiple uses in either new construction or existing building renovations.

It is another object of the present invention to provide a horizontally oriented baseboard mounted electrical work box with an internal fastener mounting bracket, for fasteners, such as screws or nails.

It is yet another object of the present invention to provide a baseboard mounted work box with a screw mounting bracket which does not protrude above the exterior silhouette shape of the work box.

A further object of the present invention is to provide a dual purpose baseboard mounted electrical work box which is economical to manufacture, easy to mount and sturdy of construction.

Therefore, these objects and related objects are attained in a dual purpose baseboard mounted electrical work box having a structure for holding different electrical wall outlets for flush horizontal mounting of the work box cantilevered above and near the baseboard floor level in either new or renovated building walls. The horizontal mounted electrical work box of the present invention may be made in various sizes, such as one gang, two gang, etc. to accommodate increasing electrical demand and number of outlets so as to permit switches or outlets to be added within the housing.

In a preferred embodiment, the baseboard or horizontal mounted electrical work boxes are formed with an angled channel within an internal fastener mounting bracket for inserting fasteners, such as nails or screws within building wall studs to provide a rigid flush fit of the baseboard mounted electrical work box to the vertical wall stud adjacent to the baseboard within the hole provided near the floor in the wall for the work box.

SUMMARY OF THE INVENTION

In accordance with the foregoing objects, and others which may become apparent, the present invention includes a dual purpose baseboard mounted electrical work box housing for electrical devices, such as outlets or switches, with a recess therein for accommodating electrical wires within the recess.

The baseboard mounted electrical work box of the present invention is interchangeable, so that the dual purpose baseboard mounted electrical work box can be mounted on either the left or right side of the vertical wall stud in either a horizontal orientation to the vertical stud, or optionally extending vertically upward from the baseboard in a vertical orientation.

Therefore, the baseboard work box housing is configured with angled mounting brackets for fasteners being situated along end wall corners, so that the box can interchangeably be mounted with its long side extending horizontally outward from the vertical wall stud, and therefore parallel to a horizontally extending baseboard stud, with the short side of the box extending vertically upward against a vertically extending wall stud. Alternatively, the box can interchangeably be mounted with its long side extending vertically upward parallel to a vertical stud and its short side being mounted to a horizontally extending baseboard stud.

The dual purpose baseboard mounted electrical work box contains walls with no external screw mounting bracket protrusions to interfere with the fitting of the baseboard mounted electrical work box within pre-cut holes within a building wall.

The baseboard mounted work box contains internal built-in angled fastener mounting bracket channel sheaths for accommodating fasteners, such as wood screws or nails, for wooden studs, or self tapping screws for metal studs.

The baseboard mounted electrical work box includes a front face support member with holes to accommodate the top and bottom of at least one electrical device, such as a wall outlet or switch, so that the interior of the outlet faces inward into the recess of the baseboard mounted electrical work box, while the front of the device, such as the outlet or switch, is flush with the building wall.

Typically, the baseboard mounted electrical work box of the present invention includes fastener mounting bracket portions on the top and bottom of the wall stud bearing side wall portion, in the vicinity of the internal angled built-in channeled brackets for the mounting fasteners, such as screws or nails.

DETAILED DESCRIPTION OF THE DRAWINGS

Figure 1:
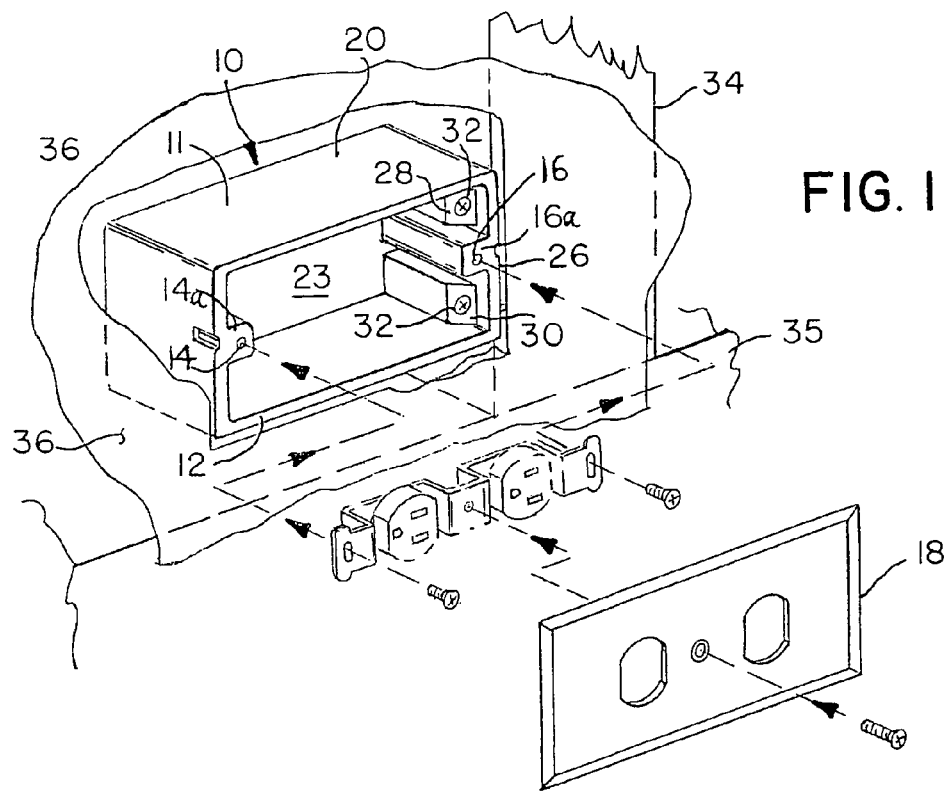
FIG. 1 is an exploded top perspective view of the baseboard mounted electrical work box of the present invention, showing a front plated removed therefrom.
Figure 2:
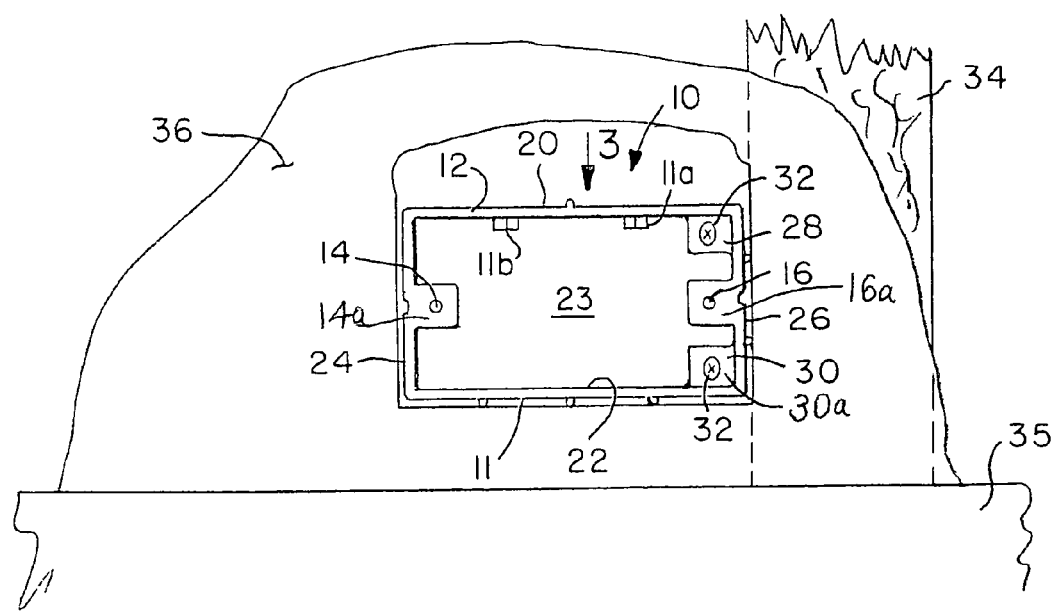
FIG. 2 is an front view of the work box shown in FIG. 1, showing a portion of a covering wall board cut away for viewing clarity purposes, show in a horizontal orientation above a baseboard.
Figure 3:
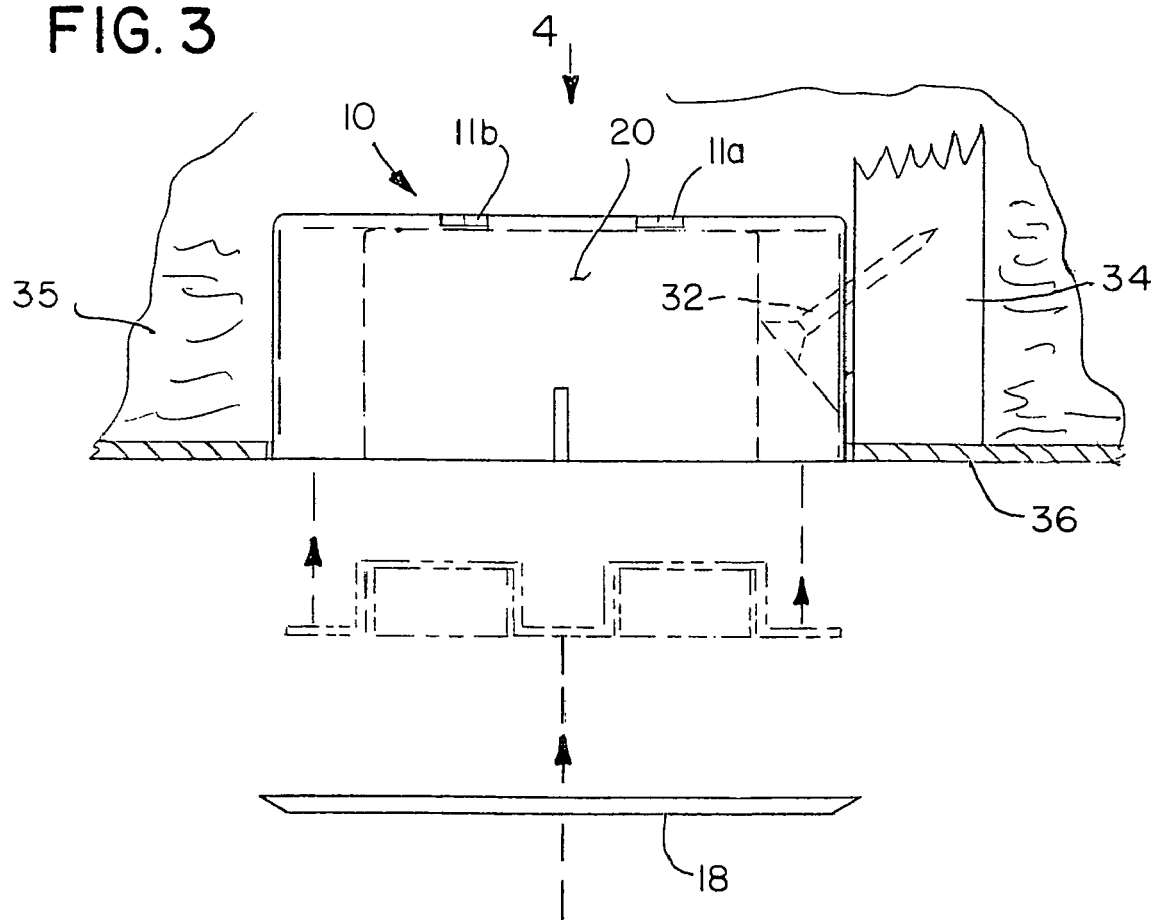
FIG. 3 is a top plan view of the work box of FIG. 1, shown looking down from above into the wall space accommodating the baseboard box.
Figure 4:
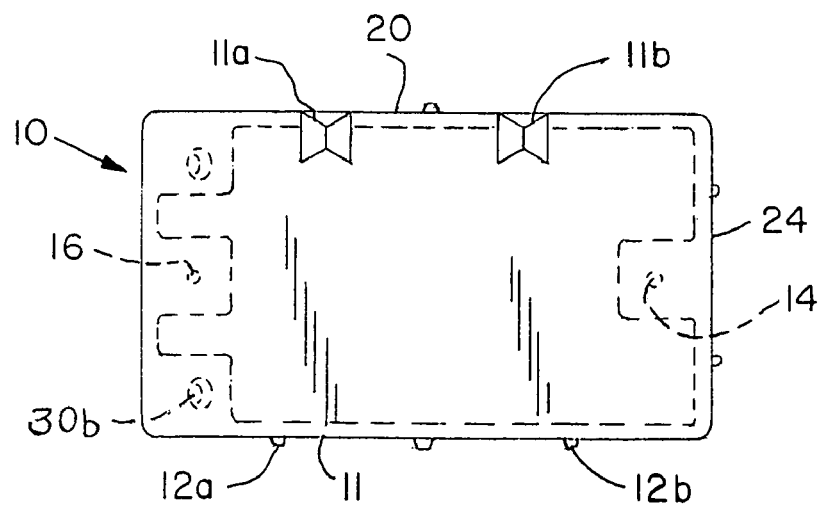
FIG. 4 is a rear view thereof.
Figure 5:
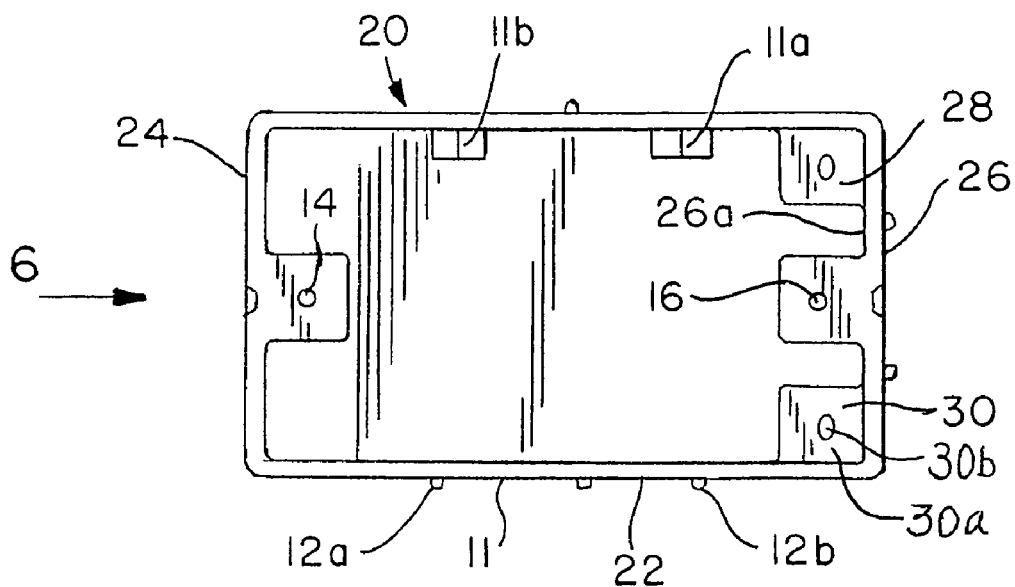
FIG. 5 is a front elevational view, shown looking into the work box of FIG. 1; and, FIG. 6 is a side elevational view of the work box of FIG. 1.
Figure 6:
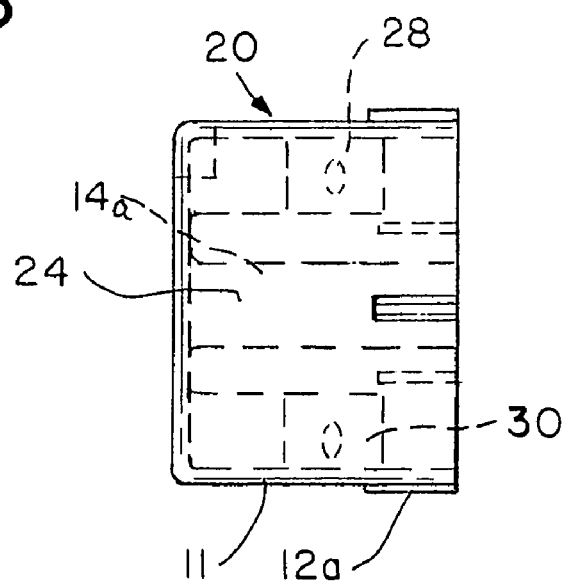

As shown in drawing FIGS. 1–6, a dual purpose horizontally or vertically oriented baseboard mounted electrical work box 10 of the present invention includes a housing 11 and a plurality of interchangeable fastener mounting brackets 28, 30 mounted within housing 11 at an end wall thereof, for accommodating holding fasteners 32, such as screws or nails, for mounting the work box 10, in particular, within and flush to a building construction wall 36. Box 10 can be mounted to vertical stud 34 in a horizontal orientation above baseboard stud 35 and can be attached by fasteners, such as screws or nails. Optionally work box 10 can be mounted to horizontal baseboard stud 35 along its short end 26 in a vertical orientation, extending up from baseboard 35.

Work box 10 is interchangeable in that work box 10 can be used in old construction, which is retrofitted into an existing wall 36, wherein a generally rectangular cut is made in the sheetrock wall 36 and work box 10 is attached to wall stud 34, or baseboard stud 35, within the cut, which cut is shaped to conform to the generally rectangular shape of front face 12 of baseboard mounted electrical work box 10.

Because work box 10 does not have an external protruding fastener mounting bracket, extending above the periphery of the outside walls, such as top wall 20, work box 10 can be easily and snugly fit in place within the cut made within wall 36.

In the alternative, baseboard mounted electrical work box 10 may be used in new construction wherein work box 10 is attached tightly to stud 34 of wall 36.

In referring to FIGS. 1–8, work box 10 includes front face 12 having channel ports 14 and 16 for accommodating the conventional line voltage outlet cover or low voltage cover 18 thereupon, as shown in FIG. 1. Baseboard work box 10 also includes top wall 20, bottom wall 22, rear wall 23, side wall 24 and side stud bearing wall 26 opposite to side wall 24. Mounting channels 14, 16 for holding screws for outlet 18 are bores within linear extension members 14a and 16a within channels 14 and 16 respectively. Extension members 14a, 16a extend perpendicular to the front face 12 of the work box 10 within interior recess 10a of work box 10 at the top and bottom respectively.

Baseboard mounted electrical work box 10 also has conventional wire feed-throughs 11a and 11b to accommodate conventional incoming wires into and out of work box 10. These apertures receive the wires for attachment to the outlet 18 attached to the front face 12 of the work box. Any one of the walls may include wire feed-throughs 11a and/or 11b for accessing electrical wires within the box.

Additionally small nib protrusions 12a and/or 12b may be provided on any of the walls, to provide a slight clearance about the mounting surface of either vertically extending wall stud 34 or horizontally extending baseboard stud 35.

Work box 10 includes at least one fastener mounting bracket module 28, and preferably a second fastener mounting bracket module 30, for accommodating one or more mounting fasteners 32, such as screws or nails therein, wherein one fastener 32 is inserted within a sheath of internal screw mounting bracket 28 at an angle relative to the planar surface 26a of mounting wall 26 for screwing into a conventional vertical building stud 34 or a baseboard stud 35.

A second fastener 32, such as a screw or nail, may be mounted within further internal screw mounting bracket 30 of work box 10.

An advantageous feature of the baseboard mounted electrical work box of the present invention is that the fastener channel 30b is fully contained within the confines of the walls of baseboard mounted electrical work box 10, and the exterior hole 30c for screw hole channel 30b is flush with the exterior of stud bearing wall 26, so that no protruding portion interferes with the positioning of baseboard mounted electrical work box 10 within the building wall.

As noted, fastener 32, such as screws or nails, may be mounted within a vertical wood stud 34 or within horizontal baseboard stud 35 and self tapping screws (not shown) may be mounted within metal walls (not shown). Fasteners 32 must be mounted at an angle, generally 45 degrees, although fasteners 32 may vary in range from about 30 degrees to 60 degrees.

Because work box 10 is recessed within the surface of wall 36, generally sheetrock, it is difficult for physical access to insert a fastener, such as a hammer or a screwdriver, therefore the fastener must be inserted at a angle within interior recess 10a of baseboard mounted electrical work box 10, as in Herth '093. However, Herth '093 describes an angled bracket midway through a stud supported wall. In contrast, to allow for both vertical and horizontal interchangeable mounting, the angled mounting brackets 28, 30 must be located at corners of an end wall of box 10. To insert fastener 32, such as a screw, at a stable configuration, fastener mounting bracket 30 is generally triangular shaped when viewed in cross-section, so that fastener 32 is screwed or otherwise applied into a bearing face 30a of fastener mounting bracket 30, which bracket has a plane which is perpendicular to the angle of the fastener 32 being inserted within fastener hole channel 30b of fastener mounting bracket 30.

The specific design of baseboard mounted electrical work box 10 depends on the particular electrical components to be shown. For example, baseboard mounted electrical work box may be one gang, two gang or three gang boxes wherein one, two or three devices, such as switches or outlets are attached to the preferred baseboard mounted electrical work box.

As noted further, stud bearing wall 26 of work box 10 is generally but not necessarily, thicker than the other walls 20, 22, 23 or 24 because mounting wall 26 is the load bearing surface of work box 10 against stud 34 of wall 36.

For installation, work box 10 is inserted flush in a hole cut in sheetrock panel 36 and then work box 10 is attached by fasteners, such as screws 32, to stud 34. In new construction, baseboard mounted electrical work box 10 is similarly attached.

Therefore, the present invention is an improvement over the prior art because baseboard mounted electrical work box 10 is interchangeable, whether it functions as an baseboard mounted electrical work box for new work or old work. Conventional It is understood that the configuration as shown is merely an example, and that the shape of the particular baseboard mounted electrical work box may be determined by specific requirements for specific installations.

Baseboard mounted electrical work box 10 eliminates the need for stocking two kinds of work boxes, since baseboard mounted electrical work box 10 can function as either a new work box or an old work box. Baseboard mounted electrical work box 10 is easy and economical to manufacture and install, and forms a strong attachment to the wall studs in building construction.

Furthermore, various modifications may be made to the present invention, which will become apparent from the pending claims, without departing from the spirit and scope of the present invention, as is noted in appended claims.

I claim:

1. A modular electrical work box for use as a new work box or an old work box and adapted for use with either a vertical wall stud or a horizontal oriented base board stud, in a building to distribute electrical power from a power supply to electrical outlets, comprising:
    a housing including a top wall, a bottom wall, a rear wall, a first side wall and a stud bearing second side wall opposite said first side wall with a front opening opposite said rear wall defined by edges of said top wall, bottom wall, and said first and second side walls;
    said housing of said work box containing a recess for insertion of electrical components, including wires and outlets;
    extension members along inner surfaces of said first and second side walls extending from the edges of said first and second side walls to said rear wall and located midway between said top and bottom walls, front surfaces of said extension members being flush with edges of said side walls having channel ports for receiving an electrical outlet extending over said front opening, wherein an interior of said outlet faces said recess within said housing;
    a fastener mounting bracket in each corner formed by said second side wall and said top and bottom walls, respectively, each said bracket including a flat first wall substantially perpendicular to and extending from said second side wall and a second wall substantially perpendicular to said first wall extending from each of said top and bottom walls, and an end surface of said bracket facing said opening being at an angle less than 90°, the brackets on the second side wall being spaced from the extension member on said second side wall;
    each fastener mounting bracket accommodating a mounting fastener through a hole extending from an end surface of said bracket to said second side wall at an angle less than 90° to said second side wall, said second side wall having an exterior hole, each said mounting fastener extending through said hole into said stud to secure said box to said stud, said mounting brackets providing a rigid fit of said work box to said stud; and
    said work box thereby being capable of being mounted extending horizontally to a vertical wall stud or extending vertically to a horizontal baseboard stud within a wall of the building.

2. A modular baseboard work box as in claim 1, wherein the dimensions of said work box equal the dimensions of a standard single, double or multiple gang box.

3. The modular baseboard work box as in claim 1, wherein said work box is mountable on either side of a vertical wall stud.

4. The modular baseboard work box as in claim 1, further comprising a plurality of small nibs, connected to the outer surface of said work box for frictionally stabilizing said work box within an entrance hole to said work box in a wall.

5. The modular baseboard work box as in claim 1, wherein said fastener angle is between 30 and 60 degrees.

6. The modular baseboard work box as in claim 5, wherein said fastener angle is 45 degrees.

7. The modular baseboard work box as in claim 1, wherein said second side wall is thicker than each of said top wall, said bottom wall, said rear wall and said first side wall.

8. The modular baseboard work box as in claim 1, further comprising at least one aperture with at least one wire feed-through aperture for accommodating conventional wires, running into and out of said work box.

* * * * *